United States Patent [19]

Pesch et al.

[11] Patent Number: 4,512,808
[45] Date of Patent: Apr. 23, 1985

[54] BINDER COMPOSITIONS BASED ON ALKALI METAL SILICATE SOLUTIONS

[75] Inventors: Wolfgang Pesch, Grevenbroich; Günter Beer, Duisburg, both of Fed. Rep. of Germany

[73] Assignee: Henkel Kommanditgesellschaft, Dusseldorf, Fed. Rep. of Germany

[21] Appl. No.: 601,393

[22] Filed: Apr. 17, 1984

[30] Foreign Application Priority Data

Apr. 21, 1983 [DE] Fed. Rep. of Germany ....... 3314475

[51] Int. Cl.$^3$ .................. C08L 91/00; C08L 95/00
[52] U.S. Cl. .................................. 106/83; 106/74
[58] Field of Search ..................... 106/83, 74

[56] References Cited

U.S. PATENT DOCUMENTS

| | | | |
|---|---|---|---|
| 3,345,302 | 10/1967 | Netting et al. ................ | 252/181 |
| 4,011,195 | 8/1977 | Self ................................. | 106/83 |
| 4,163,000 | 7/1979 | Kashima et al. .............. | 106/83 |
| 4,399,250 | 8/1983 | La Bate ......................... | 106/83 |
| 4,425,291 | 1/1984 | Beer et al. .................... | 106/83 |

FOREIGN PATENT DOCUMENTS

| | | |
|---|---|---|
| 1519250 | 2/1970 | Fed. Rep. of Germany . |
| 2729194 | 1/1979 | Fed. Rep. of Germany . |
| 2001333 | 1/1979 | United Kingdom . |
| 2058818 | 4/1981 | United Kingdom . |

*Primary Examiner*—Arthur P. Demers
*Attorney, Agent, or Firm*—Ernest G. Szoke; Mark A. Greenfield; Harry E. Millson, Jr.

[57] ABSTRACT

A binder composition for coatings, adhesives, and the like is afforded comprising an aqueous mixture of at least one alkali silicate and at least one maleic acid anhydride ethylene or methylvinyl ether copolymer.

18 Claims, No Drawings

BINDER COMPOSITIONS BASED ON ALKALI METAL SILICATE SOLUTIONS

BACKGROUND OF THE INVENTION

1. Field of the Invention

This invention relates to binder compositons based on aqueous alkali metal silicate solutions, i.e. waterglass solutions, containing organic polymers. Binders of this type may be used, for example, for waterglass primers, paints, plasters, coatings, cements and adhesives.

2. Statement of the Prior Art

Paints, plasters, adhesives and coatings based on waterglass solutions are relatively brittle and often not sufficiently waterproof after drying. Further disadvantages and problems of waterglass-based compositions of this type are that fillers and pigments cannot always be satisfactorily dispersed in pure waterglass solutions, and that the rheological properties of compositions of the type in question cannot be optimally adjusted as required for a number of applications.

There have been a number of previous attempts to optimize desirable properties of binders so that, along with adequate thermal and fire resistance, the various remaining surface properties are improved. Such improvements apply in particular to the rheological properties, dispersion behavior, adhesion, silicification and water resistance, coupled with a reduction in the brittleness of the dried films. However, it has been found that measures which improve some properties have precisely the opposite effect on others. For example, it is possible by increasing the molar ratio of $SiO_2$ to $Me_2O$ (Me=alkali metal) of the waterglass solution to increase the water resistance of the dried films. Unfortunately, this measure also increases the brittleness of the films or coatings.

German patent application No. 27 29 194, and corresponding British Patent Specification Nos. 2,001,333 and 2,058,818 describe adhesives and/or coating compositions for mineral fibers based on alkali silicate solutions which contain a material with more than 20% of the mineral kaolinite and a water-soluble, alkalistable organic polymer. The particular organic polymer disclosed is polymethacrylate. Adhesives such as these are said to be distinguished by favorable storage stability and also by the fact that the bindings and coatings obtained do not become brittle and are highly water-resistant.

German patent application No. 15 19 250 relates to a process for the production of stable, water-dispersible silicate-based powder mixtures using alkali silicate and fillers. In this process, an alkali silicate is mixed with an organic polymer, disclosed as an alkali (particularly sodium) polyacrylate and/or polygalactomannitol, and with a reactive or inert filler and the resulting mixture is dried. The powders obtained may be dispersed in water and may be used in that form as silicate paints and coating compounds. These dispersions are also said to be distinguished by favorable stability in storage and to give coatings characterized by high abrasion resistance, bond strength and water resistance.

It has been found that although some of the performance properties of the waterglass binders under discussion, for example their dispersion behavior or their rheological properties, can be improved by means of polyacrylates or polymethacrylates (chosen from the large number of different, commercially available products), other properties are always adversely affected at the same time.

For example, the dispersion behavior of waterglass solutions can be improved by the addition of polyacrylates or methacrylates containing a large number of carboxyl groups. Unfortunately, this addition gives rise to the disadvantage that, in acidic form, solid long-chain resins of the type in question cannot be properly incorporated, if at all, in waterglass solutions.

By contrast, the thixotropic properties of waterglass paints, plasters, coatings or adhesives can be improved by the addition of long-chain, crosslinked resins having a high acrylate content. Resins of this type are normally prepared and marketed in the form of aqueous dispersions. Dispersions such as these may be homogeneously stirred into waterglass solutions, even in acidic form, after dilution with water. However, the wetting agents used in the preparation of the dispersions, even if present in small quantities, reduce the water resistance of the waterglass solutions and cause them to foam, which in turn causes the formation of craters in the paints and coatings obtained therefrom.

Generally, it has been found that the addition of acrylate or methacrylate polymers does not sufficiently reduce the brittleness of the waterglass products. Additionally, some resins even increase the tendency towards cracking of the coatings obtained therewith.

U.S. Pat. No. 3,345,302 describes a formulation based on soluble silicates which consists of a solid, acidic component and of a solid, water-soluble silicate. The individual particles of the acidic component are coated (preferably sprayed) with a film-forming copolymer (which is insoluble in water at a pH of less than 8) of maleic acid anhydride and alkyl vinyl ethers or olefins of which only 50 to 70% is esterified with an alcohol. When this formulation is mixed with water whose pH is 8 or higher, the copolymer dissolves and releases the acidic component which, in turn, neutralizes the silicate now also dissolved and precipitates it in the form of silica gel. The solid formulations show high stability in storage and, after dissolution in water, are used as binders for refractory materials.

However, clear, alkaline aqueous solutions based on waterglass of the type which the present invention seeks to provide cannot be obtained in this way because the partial esters (i.e., esters in which at least one hydroxyl remains unesterified) of the copolymers described in U.S. Pat. No. 3,345,302 are too hydrophobic. This means that partial esters such as these cannot be incorporated in waterglass solutions, but instead always float on the solution.

DESCRIPTION OF THE INVENTION

The present invention affords clear, alkaline binders based on aqueous alkali metal silicate solutions which do not separate into various phases. They are distinguished by an improvement in their performance properties, particularly their rheological properties, dispersion behavior, adhesion and silicification, as well as in the water resistance and brittleness of the dried films formed from them.

It has now surprisingly been found that this can be achieved by the addition of certain copolymers of maleic acid anhydride and ethylene or methyl vinyl ether, of which the anhydride groups are hydrolyzed and neutralized, to aqueous alkali metal silicate solutions.

Accordingly, the present invention relates to binders based on aqueous alkali metal silicate solutions containing organic polymers, which contain, and preferably consist essentially of, the following components:

(a) aqueous alkali metal silicate solutions with a molar ratio of $SiO_2$ to $Me_2O$ (Me=sodium, potassium and/or lithium) of from about 3 to 5:1, preferably about 3.4 to 4.3:1, and an $SiO_2$-content in the range from about 12 to 30%, preferably 20 to 30%, by weight, based on the composition as a whole, (b) from about 0.1 to 1.5% by weight, based on the composition as a whole, of water-soluble crosslinked and/or uncrosslinked copolymers of maleic acid anhydride and ethylene or methyl vinyl ether, of which the anhydride groups are hydrolyzed and neutralized, or mixtures thereof.

The binder compositions of this invention are clear, aqueous alkaline solutions which do not undergo phase separation or an increase in viscosity, even in the event of prolonged storage. In addition, by comparison with conventional binders, the compositions of this invention show a distinct improvement in all the above-mentioned performance properties without being accompanied by deteriorations in others. Another particular advantage of the binder compositions of this invention is that their thixotropic properties may be adjusted as required by varying the molecular weight and degree of crosslinking of the copolymers.

Useful polymers in the binder compositions of this invention include water-soluble copolymers of maleic acid anhydride with ethylene or methyl vinyl ether, irrespective of their molecular weight, both crosslinked and also uncrosslinked copolymers being suitable. Mixtures of these copolymers may also be used in accordance with the invention.

Copolymers of the above type are soluble in water that is acid, neutral, or alkaline. When dissolved in water, the anhydride structures present are first hydrolyzed to form the free carboxyl groups which in turn may be neutralized with alkalis and are capable of forming the corresponding salts. Dissolution of the copolymers in alkaline solutions leads directly to the corresponding salts with neutralization of the carboxyl groups.

Copolymers suitable for use in accordance with the invention are, for example, the maleic acid anhydride/ethylene copolymers which are marketed under the trademark EMA by the Monsanto Co., St. Louis, Mo., U.S.A. Corresponding linear EMA copolymers (EMA 1103, EMA 21, EMA 31) are characterized with regard to their molecular weight by specific viscosities in the range from 0.28 to 1.2 (as measured on 1% solutions in dimethyl formamide at 25° C.). Crosslinked EMA copolymers (EMA 61, EMA 91) have gel viscosities in the range from 10,000 to 210,000 (the gel viscosity is measured at 25° C. on a 1% aqueous solution adjusted with ammonia to pH 9 using a Brookfield RVT viscosimeter (a trademark of Brookfield Engineering Labs., Inc., Stoughton, Mass., U.S.A.) with a number 6 spindle turning at 5 revolutions per minute).

Other copolymers suitable for use in accordance with the invention are, for example, the maleic acid anhydride/methylvinyl ether copolymers marketed under the trademark GANTREZ AN by the GAF Corp., New York, N.Y., U.S.A. These GANTREZ AN copolymers (for example types 119, 139, 149, 169 and 179) are characterized with regard to their molecular weight by specific viscosities in the range from 0.1 to 4.5 (as measured on 1% solutions in methyl ethyl ketone at 25° C.).

In principle, binders according to the invention may be obtained with any EMA and GANTREZ copolymers of the above-mentioned type. The properties of the binder obtained may be adjusted as required through the choice of the copolymer used for addition to the waterglass solution. However, it is preferable in accordance with the invention to use the higher molecular weight and/or more crosslinked copolymers because they enable the best results to be obtained with regard to optimization of all the performance properties. Preferred copolymers include, in particular, EMA types 61 and 91 (gel viscosities 10,000 to 22,000 mPas and 160,000 to 210,000 mPas, respectively) and also GANTREZ type AN 179 (specific viscosity 3.6 to 4.5).

The binder compositions according to this invention contain from about 0.1 to 1.5%, preferably .1 to 1.2% and most preferably from 0.2 to 0.5% by weight, based on the composition as a whole, of the water-soluble copolymers discussed above, of which the anhydride groups are hydrolyzed and neutralized. A content of copolymers such as these within the specified ranges, particularly within the preferred ranges specified, is responsible for the advantageous properties of the binders according to the invention. In principle, the binders could safely have an even higher content of copolymers of the type in question, although this would not afford any further advantages.

The other essential ingredient of the binder compositions of this invention is the aqueous alkali silicate (waterglass) solution. Any of the conventional soluble alkali silicates may be used. Alkali metal silicates are preferred, particularly the sodium, potassium, and lithium silicates or any mixture thereof, i.e. "mixed glasses." Potash waterglass and/or soda waterglass are particularly preferred. All soluble silicates may be useful for the purposes of this invention, in varying degrees. Organic alkali silicates which are the silicate salts of organic alkalies will also be useful, provided that they are water-soluble. Such organic salts include, but are not limited to, sodium tetraethanolammonium silicates. Using mixtures of the preferred aqueous alkali silicate solutions (i.e., the mixed glasses) in the binder compositions of this invention results in particular in an increase in the water resistance of the coatings and bonds obtained with the binders.

The binder compositions according to the invention are characterized by a content of an aqueous alkali metal silicate solution with a molar ratio of $SiO_2$ to $Me_2O$ (Me=sodium, potassium and/or lithium) of about 3–5:1, preferably about 3.4–4.3:1, and an $SiO_2$-content in the range from about 12 to 30%, preferably about 20 to 30%, by weight, based on the total weight of the binder composition.

To produce the binder compositions according to the invention, the above-mentioned copolymers of maleic acid anhydride and ethylene or methyl vinyl ether are first dissolved in water, preferably while heating. After hydrolysis of the anhydride groups to form carboxyl groups, the solutions formed may readily be incorporated with stirring in the aqueous alkali metal silicate solutions. The free carboxyl groups of the copolymers are neutralized by the alkaline waterglass solutions and as a result the original molar ratios of $SiO_2$ to $Me_2O$ of the waterglass solutions are displaced towards slightly higher values through the minor consumption of alkali. For example, the range of the mol ratio of $SiO_2$ to $Me_2O$ may be displaced to about 2.9–4.9:1 and the $SiO_2$ content to 20–40%. The numerical values characteristic of the added waterglass (during the process) should not be equated with those of the waterglass solution in the final binder formulation. The binder preparations ultimately obtained are in the form of clear, homogeneous solutions.

The higher molar ratios established in this way correspond to those mentioned above which apply to the alkali metal silicate solutions present in the binders according to the invention.

In a second process for producing the binders, the copolymers are first hydrolyzed in water and subsequently neutralized with alkalis.

Compounds useful for neutralizing the copolymer solution are those which do not adversely affect the desired properties of the binder composition and include: water-soluble amines and quaternary ammonium bases such as ethylenediamine, triethanolamine, triisopropanolamine, dimethylaminopropanol, tetraethyl ammonium hydroxide and the like; and water-soluble alkali metal hydroxides such as lithium hydroxide hydrate, sodium hydroxide, potassium hydroxide and the like. Triethanolamine, tetraethyl ammonium hydroxide, and lithium hydroxide hydrate are preferred. The neutralizing compounds are used in an amount sufficient to achieve the desired pH, which amount will necessarily vary with the copolymer as well as the alkalinity of the neutralizing 15 compound itself. The solutions thus obtained may then be stirred, again without difficulty, into the waterglass solutions, resulting once again in the formation of clear, homogeneous binder solutions.

According to the invention, however, it is preferred to adopt the first process which directly yields the desired binder formulations. In addition, the formation of alkali metal silicate solutions fairly rich in silica which this procedure involves brings about an improvement in the water resistance of the coatings and bonds obtained with the binder. The copolymers present in the binder optimally counteract the tendency of the films towards embrittlement normally caused by the increased molar ratio, so that even relatively thick layers of the waterglass binders according to the invention show a distinctly reduced tendency towards cracking.

Finely particulate inorganic fillers, of the type normally used in waterglass-based binders, may be added to the binder compositions of this invention, depending on the purpose for which they are to be used. Known uses include binders for paints, plasters, coatings, adhesives, and the like. Suitable fillers of this type are, in general, any fillers that are compatible with waterglass, for example, quartz powder, kaolins, crystalline calcium carbonate, micromica or magnesium aluminium silicates. In addition, any of the additives normally used for waterglass binders may also be added to the inventive compositions.

In producing the binder compositions of this invention, at least one of the disclosed copolymers is first dissolved in water, preferably while heating. For some compositions, it may be desirable to neutralize the copolymer solution with an alkalizing compound. The copolymer solution is then combined, while stirring, with at least one chosen silicate waterglass) solution. Deionized water may be used to avoid clouding caused by reactions between salts present in the water and the silicate solution.

EXAMPLES

The production of binder compositions according to this invention is described in detail in the following examples. The binder compositions are all within the scope of this invention and their performance properties comply with the requirements stated in the foregoing description of this invention.

The components used for producing binders according to the invention are defined in the following examples. For Examples 1 to 8, the particular copolymers mentioned were first dissolved in water while heating and the resulting solution subsequently mixed while stirring with the particular waterglass solution indicated. For producing the binders according to Examples 9 and 10, the copolymers, after dissolution in water, were first neutralized with the particular alkali component indicated and then combined while stirring with the waterglass solution. Deionized water was used in all the Examples to avoid the appearance of undesirable clouding caused by reactions between the salts responsible for the hardness of water and the waterglass.

The percentages below are always percentages by weight. The abbreviation MAA stands for maleic acid anhydride and the abbreviation MR for the molar ratio of $SiO_2$ to $Me_2O$.

EXAMPLE 1

0.58% of MAA/methyl vinyl ether copolymer, high molecular weight, specific viscosity=3.6 to 4.5 (GANTREZ AN 179)
27.42% of water, deionized
72.00% of potash waterglass, MR=4:1, $SiO_2$ content=21%.

EXAMPLE 2

0.22% of MAA/ethylene copolymer, high molecular weight and crosslinked, gel viscosity=10,000–22,000 mPas (EMA 61)
17.28% of water, deionized
82.50% of potash waterglass, MR=4:1, $SiO_2$ content=21%.

EXAMPLE 3

0.44% of MAA/ethylene copolymer, medium molecular weight, specific viscosity=0.9–1.2 (EMA 31)
9.56% of water, deionized
90.00% of potash waterglass, MR=4:1, $SiO_2$ content=21%.

EXAMPLE 4

0.2% of MAA/ethylene copolymer, a mixture of low molecular weight and high molecular weight crosslinked types, specific viscosity=0.5–0.7, gel viscosity=160,000–210,000 mPas (EMA 21/EMA 91, ratio by weight 1:3)
29.8% of water, deionized
70.0% of potash waterglass, MR=4.3:1, $SiO_2$ content=20.6%.

EXAMPLE 5

1.2% of MAA/methyl vinyl ether copolymer, high molecular weight, specific viscosity=3.6–4.5 (GANTREZ AN 179)
18.8% of water, deionized
80.0% of potash waterglass, MR=3.49:1, $SiO_2$-content=23.8%.

EXAMPLE 6

0.1% of MAA/ethylene copolymer, high molecular weight and uncrosslinked, gel viscosity=160,000–210,000 mPas (EMA 91)

9.9% of water, deionized
90.0% of soda waterglass, MR=3.9:1, SiO$_2$ content=22.1%.

EXAMPLE 7

0.2% of MAA/methyl vinyl ether copolymer, low molecular weight, specific viscosity=0.1–0.5 (GANTREZ AN 119)
9.8% of water, deionized
90.0% of soda waterglass, MR=3.45:1, SiO$_2$ content=29.4%.

EXAMPLE 8

0.1% of MAA/ethylene copolymer, low molecular weight, specific viscosity=0.5–0.7 (EMA 21)
19.9% of water, deionized
80.0% of soda/potash mixed waterglass, MR=3:1, SiO$_2$ content=25.3%.

EXAMPLE 9

0.45% of MAA/ethylene copolymer, high molecular weight and crosslinked, gel viscosity=10,000 to 22,000 mPas (EMA 61)
1.82% of triethanolamine
31.06% of water, deionized
66.67% of potash waterglass, MR=4:1, SiO$_2$ content=21%.

EXAMPLE 10

0.30% of MAA/ethylene copolymer, high molecular weight and crosslinked, gel viscosity 160,000–210,000 mPas (EMA 91)
0.19% of lithium hydroxide hydrate (LiOH H$_2$O)
29.51% of water, deionized
70.00% of soda waterglass, MR=3.9:1, SiO$_2$-content=22.1%.

Theoretical Working Examples

The formulations of Examples 1–10 are each tried as binders in various waterglass primers, paints, plasters, coatings, cements and adhesives. Although the effectiveness naturally varies, depending upon the particular formulation and the particular binder utility, all of the formulations are found to be acceptable for the stated binder purposes of this invention.

In a test for storage stability, formulations according to this invention are shown to be stable and do not evidence noticeable phase separation or viscosity increase. They remain substantially clear solutions even after prolonged storage.

Further Variations of this Invention

It should be noted that silicates are rarely available in their pure form and are usually mixtures of various alkali metals with varying amounts of silicate. All such mixtures are within the scope of this invention provided that they are water-soluble, although alkali silicates not specifically mentioned above may not be preferred. Rubidium silicates such as the disilicate and tetrasilicate may also be used, as well as mixed complexes such as sodium lithium metasilicate and potassium lithium disilicate.

We claim:

1. A binder composition comprising:
   (a) at least one alkali silicate aqueous solution whose mol ratio of SiO$_2$ to Me$_2$O is about 3–5:1 and wherein the silicate content is about 12–30% by weight, based on the total weight of the composition;
   (b) at least one water-soluble copolymer of maleic acid anhydride and an ethylene or a methylvinyl ether, whose anhydride groups are hydrolyzed and neutralized, present in about 0.1–1.5% by weight, based on the total weight of the composition; and
   (c) water for the remaining balance.

2. The binder composition of claim 1 wherein:
   the mol ratio of SiO$_2$ to Me$_2$O is about 3.4–4.3:1
   the silicate content is about 20–30% by weight; and
   the copolymer is present in about 0.1–1.2% by weight.

3. The binder composition of claim 2 wherein:
   the copolymer is present in about 0.2–0.5% by weight.

4. The binder composition of claim 1 wherein the alkali silicate is at least one alkali metal silicate or organic alkali silicate in aqueous solution.

5. The binder composition of claim 1 wherein the alkali silicate is at least one alkali metal silicate in aqueous solution.

6. The binder composition of claim 1 wherein the alkali silicate is a sodium silicate, a potassium silicate, a lithium silicate, or any mixture thereof, in aqueous solution.

7. The binder composition of claim 2 wherein the alkali silicate is a sodium silicate, a potassium silicate, a lithium silicate, or any mixture thereof, in aqueous solution.

8. The binder composition of claim 3 wherein the alkali silicate is a sodium silicate, a potassium silicate, a lithium silicate, or any mixture thereof, in aqueous solution.

9. The binder composition of claim 6 wherein the alkali silicate is potash waterglass, soda waterglass, or a mixture thereof.

10. The binder composition of claim 7 wherein the alkali silicate is potash waterglass, soda waterglass, or a mixture thereof.

11. The binder composition of claim 8 wherein the alkali silicate is potash waterglass, soda waterglass, or a mixture thereof.

12. The binder composition of claim 1 wherein the water-soluble copolymer is at least one of:
   (i) a linear maleic acid anhydride/ethylene copolymer with a specific viscosity, as measured at 25° C. on 1% solutions in dimethyl formamide, in the range about 0.28 to 1.2;
   (ii) a crosslinked maleic acid anhydride/ethylene copolymer with a gel viscosity, as measured at 25° C. on a 1% aqueous solution of pH 9, in the range about 10,000 to 210,000; or
   (iii) a maleic acid anhydride/methylvinyl ether copolymer with a specific viscosity, as measured at 25° C. on 1% solutions in methylethyl ketone, in the range about 0.1 to 4.5.

13. The binder composition of claim 2 wherein the water-soluble copolymer is at least one of:
   (i) a linear maleic acid anhydride/ethylene copolymer with a specific viscosity, as measured at 25° C. on 1% solutions in dimethyl formamide, in the range about 0.28 to 1.2;
   (ii) a crosslinked maleic acid anhydride/ethylene copolymer with a gel viscosity, as measured at 25° C. on a 1% aqueous solution of pH 9, in the range about 10,000 to 210,000; or (iii) a maleic acid anhydride/methylvinyl ether copolymer with a specific viscosity, as measured at 25° C. on 1% solutions in methylethyl ketone, in the range about 0.1 to 4.5.

14. The binder composition of claim 3 wherein the water-soluble copolymer is at least one of:
   (i) a linear maleic acid anhydride/ethylene copolymer with a specific viscosity, as measured at 25° C. on 1% solutions in dimethyl formamide, in the range about 0.28 to 1.2;
   (ii) a crosslinked maleic acid anhydride/ethylene copolymer with a gel viscosity, as measured at 25° C. on a 1% aqueous solution of pH 9, in the range about 10,000 to 210,000; or
   (iii) a maleic acid anhydride/methylvinyl ether copolymer with a specific viscosity, as measured at 25° C. on 1% solutions in methylethyl ketone, in the range about 0.1 to 4.5.

15. The binder composition of claim 6 wherein the water-soluble copolymer is at least one of:
   (i) a linear maleic acid anhydride/ethylene copolymer with a specific viscosity, as measured at 25° C. on 1% solutions in dimethyl formamide, in the range about 0.28 to 1.2;
   (ii) a crosslinked maleic acid anhydride/ethylene copolymer with a gel viscosity, as measured at 25° C. on a 1% aqueous solution of pH 9, in the range about 10,000 to 210,000; or
   (iii) a maleic acid anhydride/methylvinyl ether copolymer with a specific viscosity, as measured at 25° C. on 1% solutions in methylethyl ketone, in the range about 0.1 to 4.5.

16. The binder composition of claim 1 with the further addition of water-soluble neutralizing compound added in an amount effective to neutralize the copolymer when in solution.

17. The binder composition of claim 16 wherein the neutralizing compound is in amine or an alkali metal hydroxide.

18. The binder composition of claim 17 wherein the neutralizing compound is triethanolamine, tetraethyl ammonium hydroxide or lithium hydroxide hydrate.

* * * * *